United States Patent [19]

Hwang

[11] Patent Number: 5,644,210
[45] Date of Patent: Jul. 1, 1997

[54] CHARGING CONTROL METHOD AND CIRCUIT OF RECHARGING BATTERY

[75] Inventor: Yong-Duk Hwang, Gumi, Rep. of Korea

[73] Assignee: SamSung Electronics co., Ltd., Suwon, Rep. of Korea

[21] Appl. No.: 579,822

[22] Filed: Dec. 28, 1995

[30] Foreign Application Priority Data

Dec. 28, 1994 [KR] Rep. of Korea ............... 1994-38101

[51] Int. Cl.$^6$ ................................................. H01M 10/44
[52] U.S. Cl. .................................. 320/22; 320/31; 320/48
[58] Field of Search ............................. 320/21, 22, 31, 320/39, 40, 48

[56] References Cited

U.S. PATENT DOCUMENTS

| | | | |
|---|---|---|---|
| 3,609,503 | 9/1971 | Burkett et al. | 320/5 |
| 4,409,538 | 10/1983 | Tabata | 320/40 X |
| 4,513,238 | 4/1985 | Orban | 320/23 |
| 4,998,057 | 3/1991 | Shinohara et al. | 320/40 |
| 5,155,428 | 10/1992 | Kang | 320/39 X |
| 5,172,044 | 12/1992 | Sasaki et al. | 320/22 |
| 5,206,579 | 4/1993 | Kawate et al. | 320/20 |
| 5,289,102 | 2/1994 | Toya | 320/22 |
| 5,352,968 | 10/1994 | Remi et al. | 320/35 |
| 5,357,187 | 10/1994 | Park | 320/20 |
| 5,408,170 | 4/1995 | Umetsu et al. | 320/39 |
| 5,444,353 | 8/1995 | Shinohara et al. | 370/39 |
| 5,451,880 | 9/1995 | Yamagishi et al. | 320/48 X |

*Primary Examiner*—Edward Tso
*Attorney, Agent, or Firm*—Robert E. Bushnell, Esq.

[57] ABSTRACT

A charging control method and circuit of a rechargable battery, able to achieve full charging of the battery by turning on/off of the battery during a given time control circuit of a recharging battery includes: a battery voltage sensing unit connected to battery inserting unit, for sensing a battery charging voltage connected; an analog/digital converter for digitalizing a voltage value sensed in the battery voltage sensing unit; a central processing unit for sensing whether or not the battery has been inserted from an output value of the analog/digital converter, repeatedly turning on/off during a given time, controlling the current supply, determining whether or not the battery is full charged, and controlling the full charged state to be displayed; a battery charging display unit for displaying the full charge state or state by a value outputted from the central processing unit; a current regulator for supplying the battery with current; a switching regulator for switching an output of the current regulator to be turned during the given time under the control of the central processing unit; and a charging path selecting unit for selecting an output of the switching regulator by the output of the central processing unit and providing the selected output to the battery inserting unit.

22 Claims, 5 Drawing Sheets

CHARGING CONTROL METHOD AND CIRCUIT OF RECHARGING BATTERY

CROSS-REFERENCE TO RELATED APPLICATIONS

This application makes reference to, incorporates the same herein, and claims all benefits accruing under 35 U.S.C. §119 arising from an application for CHARGING CONTROL METHOD AND CIRCUIT OF RECHARGING BATTERY earlier filed in the Korean Industrial Property Office on the 28th day of Dec. in the year 1994 and there duly assigned Ser. No. 38101/1994.

BACKGROUND OF THE INVENTION

The present invention relates to a circuit and process for controlling recharging of batteries and, more particularly, to a circuit and a process for obtaining fully charged batteries by interrupting the charging of the battery during a given time.

Generally, one widely used method for sensing the fully charged state of a battery during recharging relies upon detection of a minus delta voltage. One battery manufacturing company has recommended detection of a minus delta voltage only when recharging a battery at high speed because a minus delta voltage is not generated in most cases while supplying the battery with electrical charging current below 0.3 C. More specifically, a minus delta voltage is not generated while a battery is at a high temperature and, if the battery has not been used for a long time or if the battery is in a low-voltage state just after manufacture, a minus delta voltage phenomenon may be generated. Furthermore, with contemporary charging circuits, since the temperature of the battery as well as its voltage should be measured in order to sense the state of the charge carded by a battery, the production cost of such circuits is high. I have also found that when an electrical current is continuously supplied to a battery, waste heat can be radiated to other components in a circuit, thereby deleteriously influencing the performance of the circuit.

One recent effort described in U.S. Pat. No. 5,444,353 to S. Shinohara, et al., for a *Battery Charger*, depends upon an immediate application of an initial constant amplitude charging current to a battery prior to making an effort to determine the state of the battery. Other contemporary efforts, such as that found in U.S. Pat. No. 5,451,880 to Yamagishi, et al., for a *Battery-Charging Circuit*, endeavors to detect a complete charge as well as an abnormality in a battery without relying upon either minus delta voltage or temperature control systems, depends upon immediate application of a quick charge to nickel-cadmium and to nickel-hydrogen type batteries, with the amplitude of the quick charging current being in the range of 0.5 C to 2.0 C. I have found that an immediate application of a charging current having an amplitude within the ranges required for attaining a quick charge, is not always wise when the possibility exists that the battery is either already fully charged or is abnormal.

SUMMARY OF THE INVENTION

It is therefore one object of the present invention to provide an improved process and battery charging circuit for controlling the electrical charging of a battery.

It is another object to provide a process and a battery charging circuit capable of sensing a fully charged state of a battery while supplying the battery with an electrical charging current below a range of 0.1 C.~0.4 C.

It is yet another object to provide a charging control method and circuit capable of eliminating a minus delta voltage by charging a battery that may generate a minus delta voltage as soon as the battery is inserted into a charging device or after checking the mount of capacity that the battery has, by continually charging the battery during a given time.

It is still another object to provide a charging control method for sensing a fully charged state of a battery without requiring additional thermal loss by exactly sensing a minus delta voltage of the battery.

It is still yet another object to provide a process for minimizing thermal loss from a battery during electrical charging by sensing the fully charged state of the battery through exactly sensing the minus delta voltage of the battery.

It is a further object to provide a charging control process for preventing adverse influence on various components of the system caused by generation of thermal emission that accompanies the charging of a battery and by accommodating thermal emission without adverse influence on the system during off-charging times, while interrupting the charging of the battery during a given time.

It is still another object to provide a process and circuit for reliably controlling charging of rechargable batteries without reliance upon a temperature control system.

These and other objects can be achieved according to the principles of the present invention by turning on and off the charging current applied by the circuit to a rechargable battery during given intervals of time, while supplying the battery with the amplitude of the charging current being below a range of 0.1 C.~0.4 C. Setting of an arbitrary time for stabilizing the gas of the battery is required, and then again charging the battery during the given time allows attainment of a full charge on the battery.

BRIEF DESCRIPTION OF THE DRAWINGS

A more complete appreciation of the invention, and many of the attendant advantages thereof, will be readily apparent as the same becomes better understood by reference to the following detail description when considered in conjunction with the accompanying drawings in which like reference symbols indicate the same or similar components, wherein.

DETAILED DESCRIPTION OF THE PREFERRED EMBODIMENTS

Figure 1:
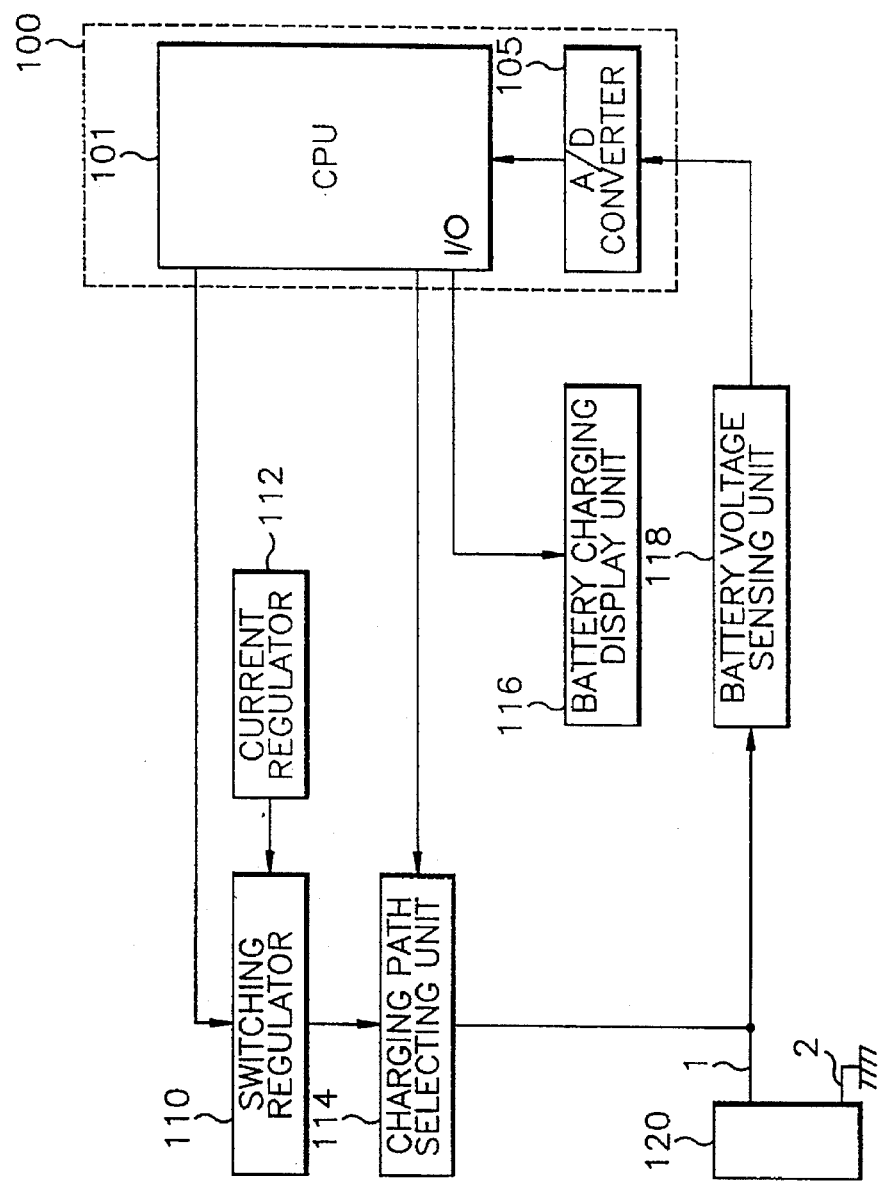
FIG. 1 is a circuit block diagram illustrating a battery charging circuit constructed as one embodiment of the present invention.
Figure 2A:
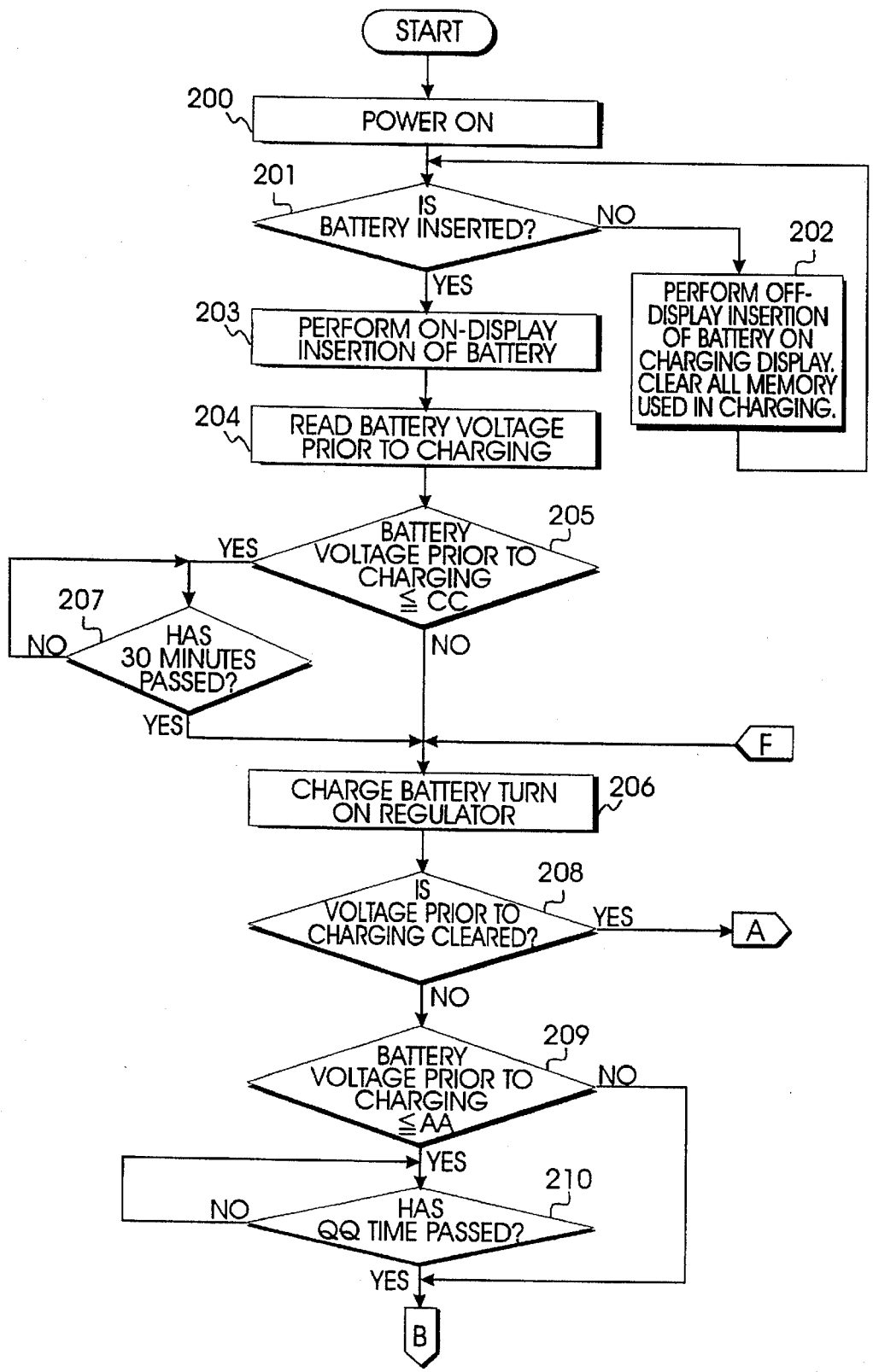
FIGS. 2A through 2E provide a flow chart illustrating a process of controlling charging of batteries according to the principles of the present invention.
Figure 2B:
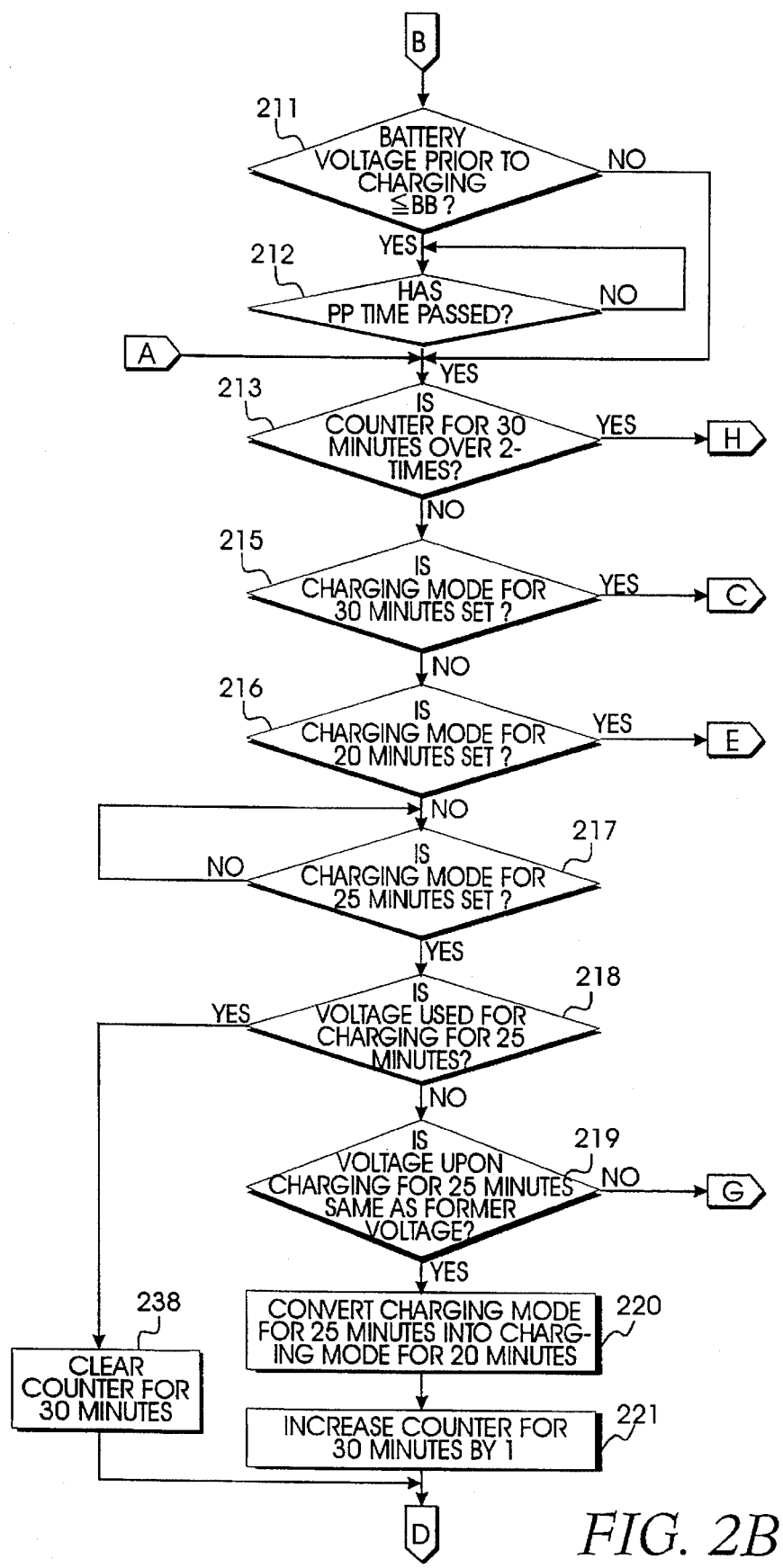
Figure 2C:
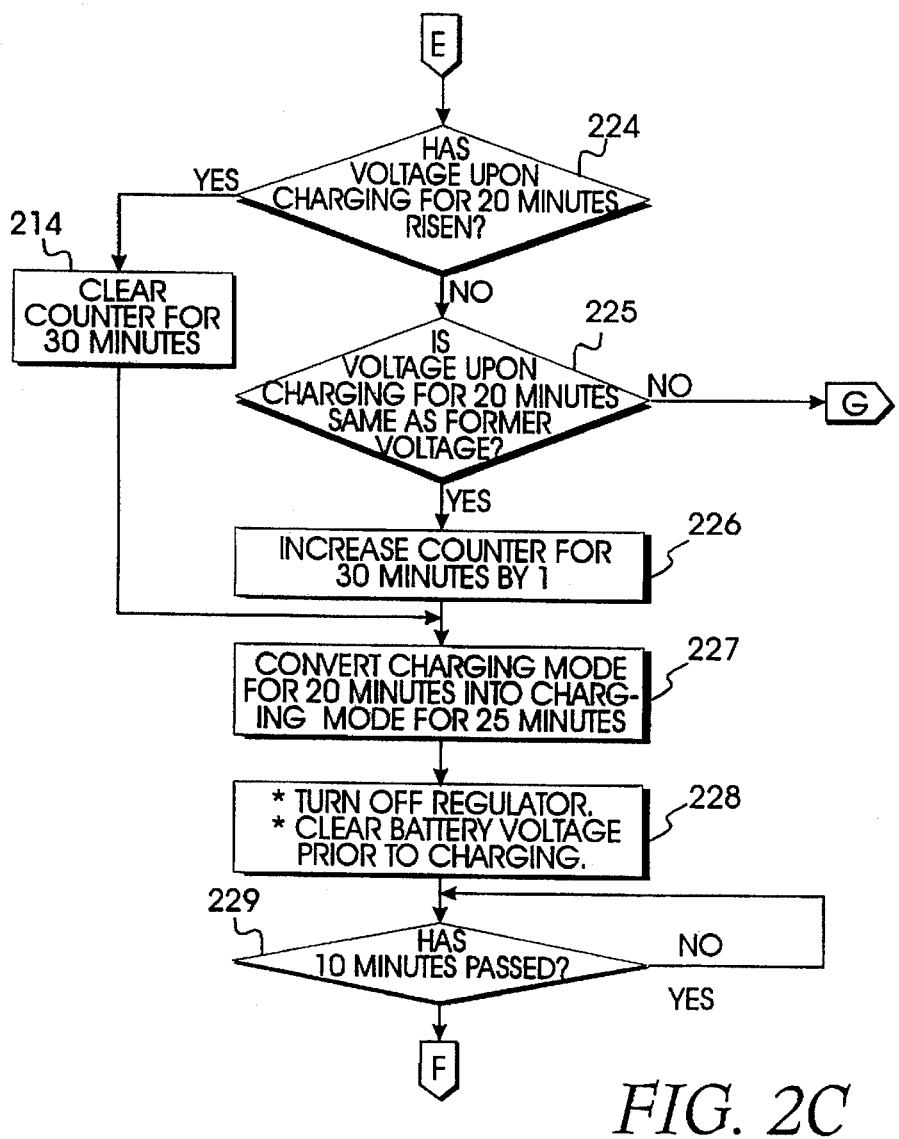
Figure 2D:
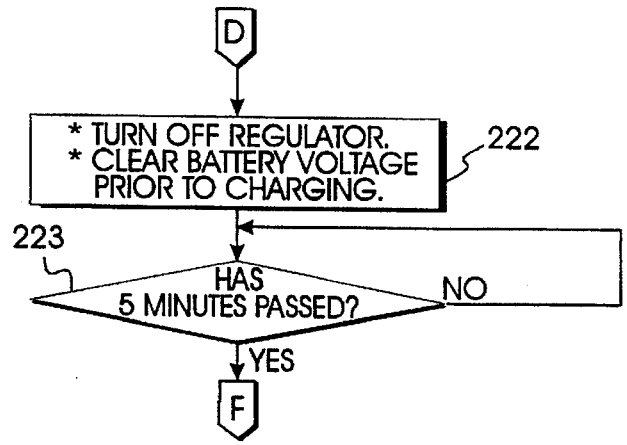
Figure 2E:
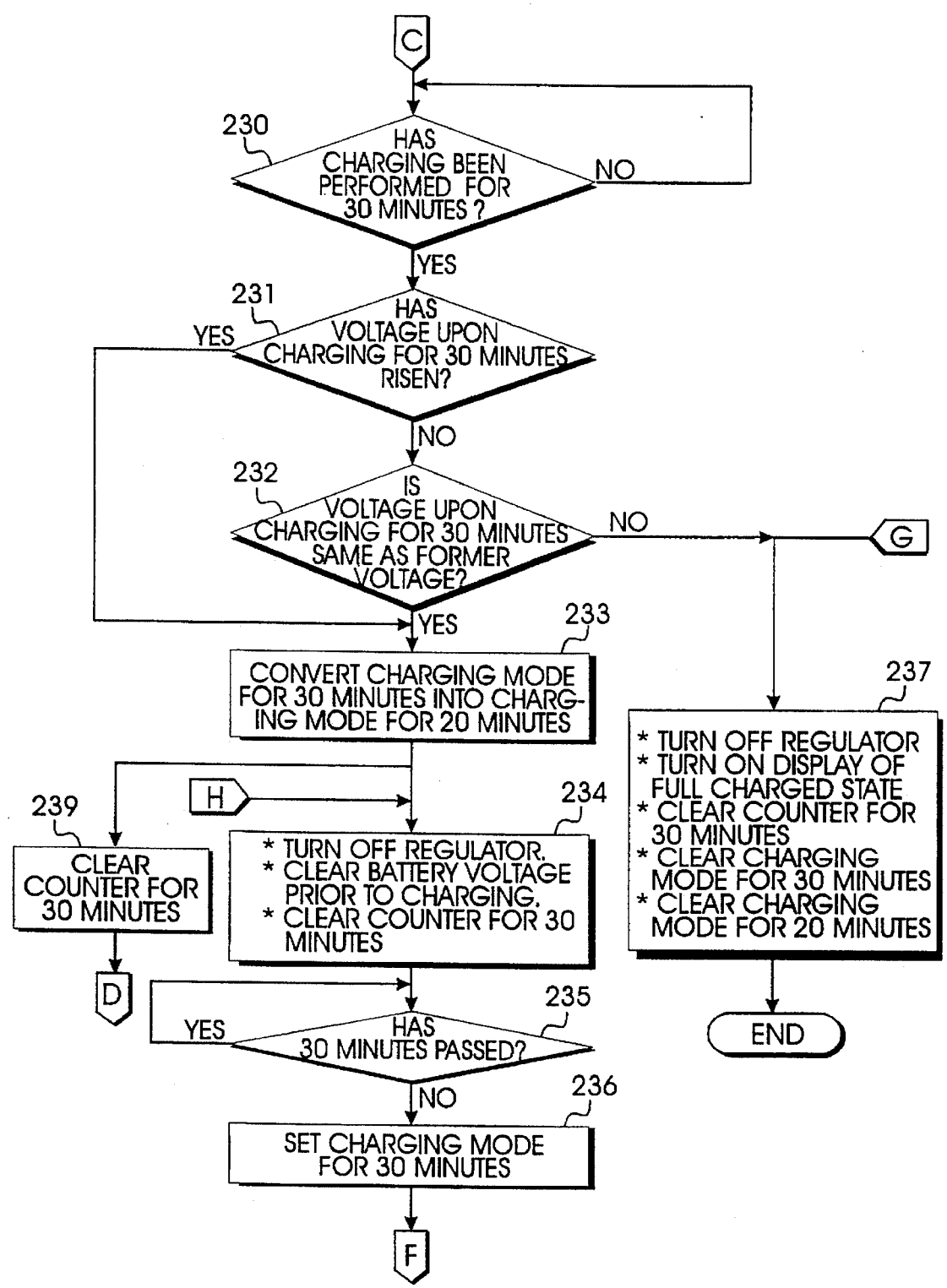

Turning now to the drawings, FIG. 1 is a block diagram illustrating battery charging a circuit for a system constructed as one embodiment of the present invention, with a battery voltage sensing unit 118 connected to a battery receptacle 120, to sense the voltage appearing across the battery held by receptacle 120. A control unit 100 has an A/D (analog-to-digital) converter 105 for digitalizing a voltage value sensed by battery voltage sensing unit 118 and a central processing unit (hereinafter, sometimes referred to as a CPU) 101 such as a single chip microprocessor, for sensing from a binary output value from A/D converter 105 whether or not the battery has been inserted into receptacle 120. Central processing unit 101 contains a read only memory storing an operational program, and a random access memory for storing process paramaters and variables; central processing unit 101 may be programmed, or wired, to repeatedly turn the charging current to a battery within receptacle 120 on and off during a given time in order to control the charging process, to determine whether or not the battery is fully charged, and to control the fully charged state of the battery to be displayed. A battery charging display unit 116 displays either the fully charged state or the current charging state of the battery on the basis of a value received from CPU 101. A current regulator 112 supplies the battery with a charging current via switching regulator 110 and charging path selecting unit 114. Switching regulator 110 switches the output current from current regulator 112 that is turned on during the given time under the control of CPU 101. Charging path selecting unit 114 selects an output current from switching regulator 110 under control of the CPU 101 and provides the selected output to the battery that has been inserted into receptacle 120.

That is, in the circuit represented by FIG. 1, when power is applied to the circuit, CPU 101 receives a binary signal from converter 105 that is representative of a voltage output of battery voltage sensing unit 118 in order to check whether any battery has been inserted into battery receptacle 120. After converting an output analog value of the battery voltage sensing unit 118 into a digital (e.g., binary) value in A/D converter 105, the digital value is applied to CPU 101, so that CPU 101 may determine on the basis of the digital value whether or not any battery has been inserted into battery receptacle 120. When a battery is inserted into receptacle 120, CPU 101 triggers a display of an "on-charging" illuminated visual message through battery charging display unit 116 by applying a control signal from one of its input/output ports to battery charging display unit 116, turns on the switching regulator 110 and charging path selecting unit 114, and thereby enables the charging current to be supplied to the battery within receptacle 120.

Further, upon reading an exact value from A/D converter 105 by using the battery voltage sensing unit 118, CPU 110 determines by using the value read whether or not the battery contained within receptacle 120 is fully charged or whether the battery will need to be further charged.

When the battery is fully charged, CPU 101 turns off a path of the charging path selecting unit 114 via one of its input/output ports, turns off switching regulator 110 and displays an illuminated visual message indicating the fully charged state of the battery through battery charging display unit 116.

FIG. 2A through 2E show different portions of a flow chart illustrating a charging control process when practiced for a particular embodiment according to the principles of the present invention. This process contemplates a first routine including step 201 for checking the state of a battery upon insertion of the battery into receptacle 120, displaying a visual indication of the state of the battery on display unit 116 in one of steps 202, 203, and reading in step 204 a battery voltage measured prior to the charging. A second routine contemplates performing the on-charging of the battery in step 206 and checking in step 208 whether the battery voltage read prior to initiation of the charging has been cleared or not, in the case that the battery voltage that was read in the first routine prior to the initiation of charging of the battery to a first voltage state has been determined in steps 205, 207 to have been maintained during a first period of time QQ. A third routine of steps 209, 210 determines whether the battery voltage of the battery prior to the initiation of charging of the battery to a second voltage state during a first period of time QQ, has been maintained in the case where step 208 has determined that the voltage read prior to the initiation of charging in the second routine has not been cleared.

A fourth routine checks during steps 211, 212 whether the battery voltage read prior to the initiation of the charging of the battery corresponds to a third voltage state in the case where the third routine has determined that the value of the battery voltage read prior to the initiation of the charging has been maintained during the third step for a second period of time PP. A fifth routine including step 213 checks whether the number of counter is over n-times from the first period of time QQ when the value of battery voltage read prior to the initiation of charging is determined during the fourth routine to have been maintained at the second voltage state during the third period of time PP. A sixth routine including steps 215, 216 determines whether charging modes corresponding to the first and second periods of time QQ and PP have been set during the fifth routine. A seventh routine includes steps 230–232 for checking the state of the battery resulting from the charging during the first period of time QQ when a recharging mode has been set by the sixth routine, and in step 233 converting the charging mode to the second period of time PP.

A eighth routine includes step 224, 225 for checking the state of the battery resulting from the charging during the second period of time PP when the charging mode for the second period of time PP is set by the sixth routine, step 226 for increasing a counter corresponding to the first period of time QQ, step 227 for converting the charging mode into another charging mode and turning off the charging, and step 229 for idling the charging of the battery for a set period of time, and then returning to the second routine, in the case that the charging value corresponding to the second period of time PP reaches a desired voltage. A ninth routine has steps 217–219 for checking the state of the battery resulting from the charging of the battery during the given time, in the case that the charging modes during the first and second periods of time QQ and PP are set by the sixth routine and charging of the battery has been performed during the given time, converted the charging mode into a different charging mode, increasing the count, turning off the supply of electrical current, and clearing the memory of central processing unit 101 of the voltage of the battery read prior to the initiation of charging, upon determining that the battery is holding a corresponding voltage over time.

An embodiment constructed according to the principles of the present invention will be in detail explained hereinafter with reference to FIGS. 1 and 2A through 2E. In this embodiment of the present invention, two examplary kinds of 4.8 volt rechargable batteries (e.g., either 4.8 mAL=0.29 C, or 1200 mAL=0.12 C.) will be used, and the charging current may be set to 140 mA. In the example illustrated by FIGS. 2A through 2E, AA is set to 4.9 Volts, BB is set to 5.2 Volts, CC is set to 5.4 Volts, PP is set to fifty-five minutes, and QQ is set to two and one-half hours. One object of achieving the charging of a battery according to the principles of the present invention strives to control the battery charging by changing the on and ofttimes of the charging current provided by the battery charging circuit. When charging the battery with a constant current, a minus delta volt phenomenon can not be sensed when the charging is respectively performed at either 0.29 C. or 0.12 C.

Charging of a battery held by receptacle 120 may be controlled by performing the on-charging of the battery for twenty-five minutes and interrupting the charging of the battery for ten minutes, because a minus delta volt will not be generated with the battery at a temperature over 40° C. due to a feature of the battery; alternatively, on-charging for thirty minutes and turning off the charging for thirty minutes may be performed.

Further, since the routine for performing the on-charging for twenty minutes and the off-charging for ten minutes can generate the minus delta volt due to the feature of the battery, the on/off time of the current charging can be varied according to the battery charging circuit using the charging control process as described above.

Here, the charging current, the voltage, the on/off time of the current charging may be varied according to particular characteristics of the battery charging circuit and the specific battery being charged.

In step 200, when the power voltage is on, CPU 101 starts to control the charging operation. In step 201, CPU 101 checks whether any battery has been inserted into receptacle 120. Then, if no battery has been inserted, CPU 101, in step 202, provides a visual display of an off-charging state through charging display unit 116. If, on the contrary, a battery has been inserted into receptacle 120, CPU 101, in step 203, displays an on-charging state on display unit 116 in accordance with of the insertion of the battery into receptacle 120. The foregoing performance is achieved by checking a value of the voltage read from the battery by the battery voltage sensing unit 118 before CPU 101 initiates the charging of the battery.

Upon performing step 204, CPU 101 checks the amount of capacity that the battery has, thereby determining the particular routine by which the battery should be charged. When the battery voltage prior to the charging is determined to be over a CC voltage, namely, 5.4 volts in step 205, CPU 101 waits and does not apply a charge to the battery for an interval of thirty minutes in step 207. After the thirty minute interval has been determined by step 207 to have passed, in step 206 CPU 101 controls switching regulator I 10 which is supplied by current regulator 112 with a charging current, and controls the charging path selecting unit 114, to thereby actually initiate charging of the battery held by receptacle 120.

That is, the object of performing the foregoing steps is to provide enough time to stabilize the battery, because the minus delta voltage phenomenon may be generated very suddenly during efforts to charge a fully charged battery. While the battery is being charged, CPU 101 checks, in step 208, whether the voltage initially determined to be held by the battery has been cleared from the memory of controller 101. Then, in step 208, now that a variance of the charging voltage is possible (i.e., when the charging voltage has been cleared from the memory of controller 101), the value of the voltage across the battery is again read by CPU 101, so as to obtain an exact determination of the contemporary voltage held by the battery. In other words, when the voltage read by CPU 101 prior to the initiation of charging is cleared from the memory of CPU 101, CPU 101 makes the determination at step 213 without condition in order to check whether the number of the counter for thirty minutes is over two times (i.e., whether two intervals of thirty minute idleness have passed).

When step 208 determines that the value of the initial voltage of the battery that was read prior to initiation of charging has not been cleared from the memory of CPU 101, CPU 101 checks, in step 209, whether the charging voltage is set over a AA voltage variable, namely, 4.9 volts. Thus, when the initial voltage read prior to the charging is not over 4.9 volts, CPU 101, in step 210, controls the current to be continuously supplied to battery for a first time period QQ, namely in this example, two hours and one-half hours. If, on the contrary, when the initial voltage read prior to the initiation of charging is over 4.9 volts, CPU 101 checks, in step 211, whether or not the initial voltage of the battery read prior to the initiation of charging is over a BB voltage variable, namely, in this example, 5.2 volts. If the initial voltage read prior to the initiation of charging is determined in step 211 to be over 5.2 volts, CPU 101 performs the step 213. If however, the initial voltage read prior to the initiation of charging is determined in step 211 to be not over 5.2 volts, CPU 101 controls, in step 212, the current being continuously supplied to battery during interval a second time period PP (namely, in this example, fifty-five minutes). Here, the reason for this difference in the on and off time intervals during charging is to minimize the problem of excessive time consumption occurring when charging the battery while turning switching regulator 110 on and off for equal intervals of time, a process which requires more time than does charging the battery with a continuous and uninterrupted flow of a constant electrical current.

Subsequently, after checking in the step 213, whether the count maintained by its counter of the number of thirty minute intervals is over two, if CPU 101 determines that the number of the counter for thirty minute intervals is over two, then during step 234 CPU 101 interrupts the charging of the battery by turning off switching regulator 110, clears from its memory the initial voltage of the battery read prior to the initiation of charging, and clears from its counter the count of the number of thirty minutes intervals. Sequentially, after checking in step 235 whether or not an interruption in the charging of the battery has been maintained for thirty minutes, in step 236, CPU 101 sets a charging mode for an interval such as thirty minutes. Accordingly, when repeating step 215, CPU 101 establishes the interval for charging the battery as thirty minutes.

CPU 101 checks, in step 230, whether charging of the battery as continued for thirty minutes, and if charging is determined in step 230 to have continued for thirty minutes, CPU 101 checks, in step 231, whether the charging voltage borne by the battery has risen during that thirty minute interval. If the voltage read across the battery is determined in step 231 to have not risen during the thirty minute charging interval, CPU 101 checks, in step 232, whether the charging voltage currently borne by the battery after thirty minutes of charging is the same as the voltage formerly read across the battery. Thus, if it is determined in step 232 that the charging voltage currently borne by the battery after thirty minutes of charging is the same as the voltage formerly read across the battery, in step 233, CPU 101 converts the charging mode for thirty minutes into a charging mode for twenty minutes. After clearing the counter of its count of thirty minute intervals in step 239, CPU 101 checks, by repetition of steps, whether the battery has additional capacity to be charged and maintains, in step 222, a charging waiting state.

When however, the voltage borne by the battery after being subjected to a thirty minute interval of charging is determined in step 232 to not be the same as the voltage previously read across the battery, in step 237 CPU 101 interrupts the charging by turning switching regulator 110 off, sets a full charged flag, controls battery charging display unit 116 to display a fully charged state visual message, and clears the counter of its count of thirty minutes intervals, clears its establishment of the interval for a charging mode of thirty minutes, and clears its establishment of the charging mode for twenty minutes. That is, when CPU 101 determines that the voltage currently borne by the battery has fallen, CPU 101 recognizes that the battery is in a fully charged state, and in step 237 controls the charging circuit to end the charging process.

In the event that CPU 101 determines during step 213 that the count held by its counter of the number of thirty minute intervals for charging the battery is not over two, and if in step 215 a determination is made that the charging mode has not been set for a thirty minute interval, CPU 101 will check in step 216 whether the charging mode has been set of a twenty minute charging interval. Here, when the charging mode is determined in step 216 to have been set for a twenty minute charging interval, and charging of the battery has been performed for the twenty minutes charging interval CPU 101 performs step 224. In step 224, CPU 101 determines whether the voltage sensed across the battery has risen after charging the battery for a twenty minute charging interval. Then, when a determination is made during step 224 that the voltage borne by the battery has not risen, CPU 101 checks, in step 225, whether the charging voltage currently borne by the battery after twenty minutes of charging is the same as the voltage formerly read across the battery. After charging the battery for the twenty minute default interval, during step 225 CPU 101 proceeds to step 237 to end the charging process.

As soon as CPU 101 CPU determines during step 224 that the voltage borne by the battery has risen, 101 performs step 214 by rearing its counter of its count of thirty minute intervals. When CPU 101 determines during step 225 however, that the voltage home by the battery is the same as the voltage, formerly read across the battery in step 226 CPU 101 increases the count maintained by its counter of thirty minute intervals by one. Thereafter, in step 227 CPU 101 converts the charging mode of twenty minute intervals into a charging mode of twenty-five minute intervals, and irregulator 110 off and clear regulator 110 off and clears from its memory the value of the battery voltage previously sensed. Next, the CPU 101 performs step 229 by idling the battery charging circuit for a ten minute interval while switching regulator 110 is maintained in a non-electrically conducting (i.e., an off) state. Subsequently, CPU 101 returns to the second routine beginning at step 206.

When the charging mode is determined during step 216 to not be set for a twenty minute charging interval, CPU 101 checks, in step 217, whether or not any charging of the battery has been performed. When the charging is determined in step 217 to have been performed, in step 218 CPU 101 checks whether the charge held by the battery has risen and upon making a determination that the charge held by the battery has risen, proceeds to step 238 and clears the counter of its count of thirty minute intervals. If the charging modes for 20 and 30 minutes are set, the CPU 101 proceeds with a charging mode of twenty-five minute intervals and charges the battery during twenty-five minute intervals. Thereafter, when CPU 101 determines in step 218 that the voltage sensed across the battery has risen, CPU 101 in step 238 clears the counter of its count of the number of thirty minute intervals. If on the contrary, CPU 101 determines during step 218 that the voltage borne by the battery has not risen, CPU 101 checks, in step 219, whether the voltage currently home by the battery is the same as the voltage previously sensed across the battery after completion of the charging of the battery for a twenty-five minute interval. At this time, if CPU 101 determines in step 219 that the voltage home by the battery after charging for twenty-five minutes is the same as the previously sensed voltage, in step 220 CPU 101 converts the charging mode of twenty-five minute intervals into the charging mode of twenty minute intervals, and in step 221 increases the count of thirty minute intervals maintained by counter by one. CPU 101 then, in step 222, turns switching regulator 110 off and clears from its memory the sensed value of the voltage held by the battery prior to the charging of the battery performed in the step 222. Subsequently, in step 223, CPU 101 turns switching regulator 110 off for an interval of five minutes. Furthermore, when CPU 101 determines in step 219 that after charging the battery for an interval of twenty-five minutes, the voltage home by the battery is not same as the previously sensed voltage of the battery, CPU 101 performs step 237 and turns switching regulator 110 off.

After performing step 233, CPU 101 returns the battery charging circuit to step 206 and charges the battery accordingly.

As described in the foregoing paragraphs, the present invention has an advantages in that the fully charged state of battery can be sensed with no additional stages required for detecting thermal measurement, by the expedience of exactly sensing a minus delta voltage of the battery. Also, while controlling the battery charging circuit by turning alternately charging and then interrupting the charging of the battery over selected intervals of time, the deleteriously affects of heat generated during the charging may be attenuated, or avoided, by the intervals of interruption in the charging.

Moreover, the present invention has an advantage in that the fully charged state of battery can be sensed during charging below 0.3 C, even in a battery in which the minus delta volt has not been generated. Also, when the battery is inserted into the charging device, the CPU does not immediately, and blindly initiate the charging of the battery, but first checks the voltage of the battery voltage prior to the charging and checks the amount of capacity that the battery has available. Therefore, embodiments constructed according to the principles of the present invention disclosed have an advantage because the minus delta voltage can be eliminated by interrupting the continous charging of the battery for constant intervals of time during the charging of the battery.

What is claimed is:

1. A battery charging control circuit, comprising:

battery voltage sensing means connected to battery inserting means, for sensing a battery voltage of a battery inserted in said battery inserting means;

analog/digital converter for generating voltage data by digitalizing a voltage value sensed in said battery voltage sensing means;

a central processing unit for repeatedly turning on/off a charging of said battery during a given time, controlling application of a charging current to said battery, determining whether said battery is fully charged, and controlling a visual display of a full charged state of said battery in dependence upon said voltage data;

battery charging display means for providing a visual display of one of said fully charged state of said battery and a charging state of said battery under control of said central processing unit;

a current regulator for supplying said battery with said charging current;

a switching regulator for switching an output of said current regulator to supply said charging current to said battery during said given time under the control of said central processing unit; and charging path selecting means for selecting an output of said switching regulator to said battery inserting means to control a sequence of on-charging of the battery and interruption of the on-charging for first, second, third, fourth, fifth and sixth time periods until the battery is fully charged under the control of said central processing unit.

2. A charging control method of a recharging battery, comprising the steps of:

(a) checking an insertion status of said battery, providing a visual display of said insertion status of said battery, and reading a battery voltage of said battery prior to a charging;

(b) performing an on-charging of said battery and checking whether said battery voltage prior to said charging has been cleared, when said battery voltage of said battery prior to said charging read in step (a) is maintained at a first voltage state during a first time period;

(c) maintaining said battery voltage of said battery prior to said charging to a second voltage state during a second time period, when said battery voltage prior to said charging read in step (b) has not been cleared;

(d) checking whether said battery voltage prior to said charging corresponds to a third voltage state during a third time period, when said battery voltage prior to said charging read in step (c) is maintained at said second voltage state during said second time period;

(e) checking whether a counter set for said first time period exceeds a predetermined count value, when said battery voltage prior to said charging read in step (d) corresponds to said third voltage state during said third time period;

(f) checking whether a charging mode for charging said battery is set for one of a fourth time period, a fifth time period and a sixth time period;

(g) checking a charging state of said battery during said fourth time period when said charging mode is set in step (f) for said fourth time period, and converting a charging mode to said fifth time period;

(h) checking a charging state of said battery during said fifth time period, when said charging mode is set in step (f) for said fifth time period, increasing said counter by a constant value corresponding to said first time period, converting a charging mode to said sixth time period, turning off said charging of said battery, and clearing said battery voltage prior to charging; and (i) checking a charging state of said battery during said sixth time period, when said charging mode is set in step (f) step for said sixth time period, increasing said counter by said constant value corresponding to said first time period, turning off said charging of said battery, and clearing said battery voltage prior to said charging.

3. The charging control method of claim 2, further comprised of said first voltage state of said battery corresponding to 5.4 Volts and said first time period for charging the battery corresponding to thirty minutes.

4. The charging control method of claim 2, further comprised of said second voltage state of said battery corresponding to 4.9 Volts and said second time period for charging the battery corresponding to two and one-half hours.

5. The charging control method of claim 2, further comprised of said third voltage state of said battery corresponding to 5.2 Volts and said third time period for charging the battery corresponding to fifty-five minutes.

6. The charging control method of claim 2, further comprised of said fourth time period corresponding to thirty minutes of charging said battery.

7. The charging control method of claim 2, further comprised of said fifth time period corresponding to twenty minutes of charging said battery.

8. The charging control method of claim 2, further comprised of said sixth time period corresponding to twenty-five minutes of charging said battery.

9. A process of charging a rechargeable battery, comprising:

providing a visual indication of a charging operation, when a battery is inserted in a battery charger for charging;

initially determining whether a battery voltage of the battery prior to charging is not above a first predetermined voltage for a first time period;

initially charging the battery with a charge current, when the battery voltage of the battery prior to charging is not above said first predetermined voltage for said first time period;

determining whether the battery voltage of the battery as initially determined has been cleared from a memory;

when the battery voltage of the battery as initially determined has been cleared from the memory, determining whether a counter set for said first time period reaches a predetermined count value;

when said counter set for said first time period does not reach said predetermined count value, determining whether a charging mode for charging the battery is set for one of said first time period, a second time period and a third time period;

when the charging mode for charging the battery is set for said first time period, charging the battery with said charge current for said first time period, determining whether the battery voltage of the battery increases after the battery has been charged with said charge current for said first time period, and continuing charging the battery with said charge current until interruption when the battery voltage of the battery after the battery has been charged with said charge current no longer increases;

alternatively, when the charging mode for charging the battery is set for said second time period, charging the battery with said charge current for said second time period, determining whether the battery voltage of the battery increases after the battery has been charged with said charge current for said second time period, and continuing charging the battery with said charge current until interruption when the battery voltage of the battery after the battery has been charged with said charge current no longer increases; and alternatively, when the charging mode for charging the battery is set for said third time period, charging the battery with said charge current for said third time period, determining whether the battery voltage of the battery increases after the battery has been charged with said charge current for said third time period, and continuing charging the battery with said charge current until interruption when the battery voltage of the battery after the battery has been charged with said charge current no longer increases.

10. The process of claim 9, further comprised of said first predetermined voltage corresponding to 5.4 Volts and said first time period for charging the battery corresponding to thirty minutes.

11. The process of claim 9, further comprising:

when the battery voltage of the battery as initially determined has not been cleared from the memory, determining whether the battery voltage of the battery prior to charging is not above a second predetermined voltage;

when the battery voltage of the battery prior to charging is above said second predetermined voltage, determining whether the battery voltage of the battery prior to charging is not above a third predetermined voltage;

when the battery voltage of the battery prior to charging is not above said second predetermined voltage, continuing charging the battery for a fourth time period and then determining whether the battery voltage of the battery prior to charging is not above said third predetermined voltage;

when the battery voltage of the battery prior to charging is above said third predetermined voltage, proceeding to determine whether said counter set for said first time period reaches said predetermined count value; and when the battery voltage of the battery prior to charging is not above said third predetermined voltage, continuing charging the battery for a fifth time period and then proceeding to determine whether said counter set for said first time period reaches said predetermined count value.

12. The process of claim 11, further comprised of said second predetermined voltage corresponding to 4.9 Volts, said fourth time period for charging the battery corresponding to two and one-half hours, said third predetermined voltage corresponding to 5.2 Volts, and said fifth time period for charging the battery corresponding to fifty-five minutes.

13. The process of claim 9, further comprised of said first time period for charging the battery corresponding to thirty minutes, said second time period for charging the battery corresponding to twenty minutes, and said third time period for charging the battery corresponding to twenty-five minutes.

14. The process of claim 13, further comprised of said battery being charged with said charge current for said first time period by:

determining first whether the battery has been charged for said first time period when the charging mode is set for said first time period;

determining whether the battery voltage of the battery increases after the battery has been charged with said charge current for said first time period;

when the battery voltage of the battery does not increase after the battery has been charged with said charge current for said first time period, determining whether the battery voltage of the battery after charging is substantially the same as the battery voltage of the battery prior to charging;

when the battery voltage of the battery after charging is not substantially the same as the battery voltage of the battery prior to charging, providing a visual display of a full charged state of the battery and terminating the charging operation; and when the battery voltage of the battery increases after the battery has been charged with said charge current for said first time period, and alternatively, when the battery voltage of the battery after charging is substantially the same as the battery voltage of the battery prior to charging, converting the charging mode for said first time period to the charging mode for said second time period, clearing the battery voltage prior to charging from said memory, interrupting supply of said charge current to the battery for charging for a fourth time period and then returning to said initial charging of the battery with said charge current.

15. The process of claim 14, further comprised of fourth time period for interrupting charging the battery corresponding to thirty minutes.

16. The process of claim 13, further comprised of said battery being charged with said charge current for said second time period by:

determining first whether the battery has been charged for said second time period when the charging mode is set for said second time period;

determining whether the battery voltage of the battery increases after the battery has been charged with said charge current for said second time period;

when the battery voltage of the battery does not increase after the battery has been charged with said charge current for said second time period, determining whether the battery voltage of the battery after charging is substantially the same as the battery voltage of the battery prior to charging;

when the battery voltage of the battery after charging is not substantially the same as the battery voltage of the battery prior to charging, providing a visual display of a full charged state of the battery and terminating the charging operation; and when the battery voltage of the battery increases after the battery has been charged with said charge current for said second time period, and alternatively, when the battery voltage of the battery after charging is substantially the same as the battery voltage of the battery prior to charging, converting the charging mode for said second time period to the charging mode for said third time period, clearing the battery voltage prior to charging from said memory, interrupting supply of said charge current to the battery for charging for a fourth time period and then returning to said initial charging of the battery with said charge current.

17. The process of claim 16, further comprised of said fourth time period for interrupting charging the battery corresponding to ten minutes.

18. The process of claim 13, further comprised of said battery being charged with said charge current for said third time period by:

determining first whether the battery has been charged for said third time period when the charging mode is set for said third time period;

determining whether the battery voltage of the battery increases after the battery has been charged with said charge current for said third time period;

when the battery voltage of the battery does not increase after the battery has been charged with said charge current for said third time period, determining whether the battery voltage of the battery after charging is substantially the same as the battery voltage of the battery prior to charging;

when the battery voltage of the battery after charging is not substantially the same as the battery voltage of the battery prior to charging, providing a visual display of a full charged state of the battery and terminating the charging operation; and when the battery voltage of the battery increases after the battery has been charge current for said charge current for said third time period, and alternative, when the battery voltage of the battery after charging is substantially the same as the battery voltage of the battery prior to charging, converting the charging mode for said third time period back to the charging mode for said second time period, clearing the battery voltage prior to charging from said memory, and interrupting supply of said charge current to the battery for charging for a fourth time period and then returning to said initial charging of the battery with said charge current.

19. The process of claim 18, further comprised of said fourth time period for interrupting charging the battery corresponding to five minutes.

20. The process of claim 9, further comprising:
when said counter set for said first time period reaches said predetermined count value, clearing the battery voltage prior to charging from said memory, interrupting supply of said charge current to the battery for charging for a fourth time period, resetting the charging mode for said first time period and then returning to said initial charging of the battery with said charge current.

21. The process of claim 20, further comprised of said first time period for charging the battery corresponding to thirty minutes, and said fourth time period for interrupting charging the battery corresponding to thirty minutes.

22. The process of claim 21, further comprising:
when the battery voltage of the battery as initially determined has not been cleared from the memory, determining whether the battery voltage of the battery prior to charging is not above 4.9 Volts;

when the battery voltage of the battery prior to charging is above 4.9 Volts, determining whether the battery voltage of the battery prior to charging is not above 5.2 Volts;

when the battery voltage of the battery prior to charging is not above 4.9 Volts, continuing charging the battery for two and one-half hours and then determining whether the battery voltage of the battery prior to charging is not above 5.2 Volts;

when the battery voltage of the battery prior to charging is above 5.2 Volts, proceeding to determine whether said counter set for said first time period reaches said predetermined count value; and when the battery voltage of the battery prior to charging is not above 5.2 Volts, continuing charging the battery for fifty-five minutes and then proceeding to determine whether said counter set for said first time period reaches said predetermined count value.

* * * * *